July 28, 1953
H. B. R. BARBIER
2,646,669
UNIVERSAL JOINT
Filed Dec. 11, 1950
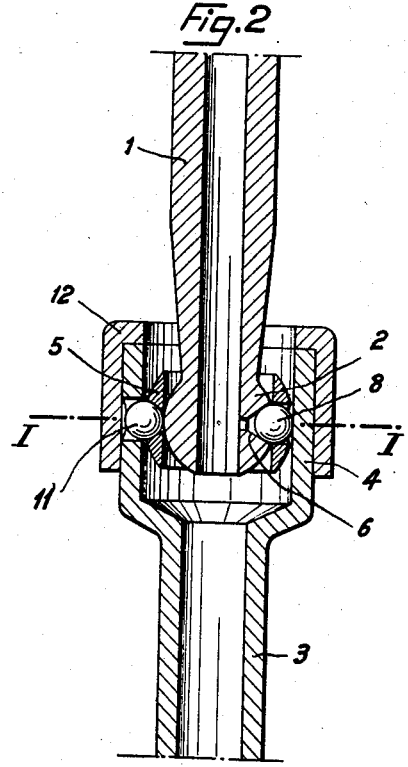
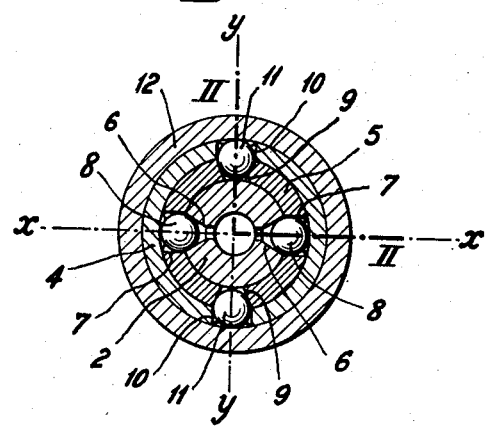
Inventor
Henri B. R. Barbier
by Stevens, Davis, Miller & Mosher
his attorneys Patented July 28, 1953

2,646,669

UNITED STATES PATENT OFFICE 2,646,669

UNIVERSAL JOINT

Henri B. R. Barbier, Givry, par Jouet-sur-l'Aubois, France

Application December 11, 1950, Serial No. 200,285
In France December 13, 1949

2 Claims. (Cl. 64—18)

The present invention has for its object a universal joint allowing the simultaneous transmission of rotation and translation forces. One of the advantages of this joint is that it may have a very small size and reduced over-all dimensions with respect to the value of the force it is capable of transmitting. It may have various applications, for instance, in controlling apparatus used for machining borings, such as grinders, in watchmaking, etc.

Each of the two perpendicular axes of the joint is materialized by a pair of balls; the balls of one pair are engaged in housings provided in the spherical head of one of the shafts and in a ring arranged around this head, whereas the balls of the other pair lie in housings provided in the outer spherical surface of said ring and in the inner surface of a cup in which is mounted the whole joint and which is fast with the other shaft.

Other objects and advantages of the invention will be apparent hereinafter.

In the accompanying drawing forming a part of this application and in which like numerals are employed to designate like parts throughout the same, Fig. 1 is a cross-section of the joint taken along plane I—I of Fig. 2 through the centres of the balls, and Fig. 2 is an axial section of the joint taken along line II—II of Fig. 1.

In the device shown in the drawing, one of the shafts 1 ends with a sphere 2 and the other shaft 3 with a cup-shaped member 4. An intermediate member or ring 5 is inserted therebetween. This ring has an inner diameter equal to the diameter of the sphere 2 and has an outer spherical surface whose diameter is that of the boring of the cup-shaped member 4. The sphere 2 comprises two diametrically opposite conical recesses 6 having preferably a taper of 60° and being in register with two ports 7 of the ring 5. The two balls 8 housed in the ports 7 and in the conical recesses 6, form the joint axis $x$—$x$ about which the shaft 1 pivots relatively to the ring 5. The thickness of ring 5 is equal to the radius of the balls.

At an angle of 90° with respect to the axis $x$—$x$, the ring 5 comprises two conical recesses 9 having preferably a taper of 60°, and the cup 4 comprises two ports 10 in register with these recesses. The two balls 11 are housed in these ports and recesses (the thickness of the cup 4 can be also equal to the radius of the balls) and form the joint axis $y$—$y$ about which the shaft 3 can pivot relatively to the ring 5. A sleeve 12 fitted around the cup 4 outwardly obturates the housings 10 thereof and thus keeps the whole device in position.

The operation of the device is self understandable.

It is to be noted that the embodiment described is not convenient in case the members 1 and 3 make important angles therebetween, as the balls 8 then run the danger of escaping.

It will be noted that all the members mainly operate under compression with no possible bending stress, so that the transmitted forces may be very large. Moreover, owing to the fact that the members transmitting the forces are balls housed in recesses having axes substantially perpendicular to that of the shafts, this joint allows the transmission of translation force, for instance parallel to the driven shaft, as far as the maximum angle formed in operation by the axes of the two shafts is not too large. It will further be noted that the new joint may be used with hollow shafts 1 and 3 so that any control device may be arranged through the joint and through the shafts: in the case of a grinder, for instance, a device for controlling the expansion of the tools as described in my copending application, Serial No. 200,284, filed at the same date as the present application for: "Control Devices for Expansible Tools used for Machining Borings."

What I claim is:

1. An universal joint for coupling two shafts, comprising in combination a substantially spherical portion at the end of one of said shafts, said spherical portion having two diametrically opposite outwardly diverging conical recesses the axes of which are substantially perpendicular to the axis of said last-mentioned shaft; a ring arranged around said spherical portion, having a substantially spherical outer surface and further having two diametrically opposite cylindrical recesses and two diametrically opposite outwardly diverging conical recesses arranged substantially perpendicularly to said cylindrical recesses; a cup-shaped member at the end of said other shaft, arranged around said ring and having two diametrically opposite cylindrical recesses the axes of which are substantially perpendicular to the axis of said other shaft; a sleeve fitted around said cup-shaped member; a pair of balls housed in the recesses of said spherical portion and in the cylindrical recesses of said ring; and a further pair of balls housed in the conical recesses of said ring and in the recesses of said cup-shaped member.

2. In a universal joint, the combination of two hollow shafts; a substantially spherical portion at the end of one of said shafts, said spherical portion having two diametrically opposite outwardly diverging conical recesses the axes of which are substantially perpendicular to the axis of said last mentioned shaft; a ring arranged around said spherical portion, having a substantially spherical outer surface and further having two diametrically opposite cylindrical recesses and two diametrically opposite outwardly diverging conical recesses arranged substantially perpendicularly to said cylindrical recesses: a cup-shaped member at the end of said other shaft, arranged around said ring and having two diametrically opposite cylindrical recesses the axes of which are substantially perpendicular to the axis of said other shaft; a sleeve fitted around said cup-shaped member; a pair of balls housed in the recesses of said spherical portion and in the cylindrical recesses of said ring; and a further pair of balls housed in the conical recesses of said ring and in the recesses of said cup-shaped member, the maximum thickness of said ring and that of said cup-shaped member being substantially equal to the radius of said last mentioned balls.

HENRI B. R. BARBIER.

References Cited in the file of this patent

UNITED STATES PATENTS

| Number | Name | Date |
|---|---|---|
| 1,633,333 | Kaptuller | June 21, 1927 |
| 1,743,672 | Hufferd | Jan. 14, 1930 |
| 1,853,171 | Nettenstrom | Apr. 12, 1932 |